(12) United States Patent
Arthur et al.

(10) Patent No.: US 6,979,805 B2
(45) Date of Patent: Dec. 27, 2005

(54) FUEL-CELL RESISTORS AND METHODS

(75) Inventors: Alan R Arthur, Salem, OR (US);
Heather Edmonds, Monroe, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 10/339,737

(22) Filed: Jan. 8, 2003

(65) Prior Publication Data

US 2004/0131904 A1    Jul. 8, 2004

(51) Int. Cl.[7] .............................................. H05B 3/02
(52) U.S. Cl. ........................ 219/538; 219/541; 219/544; 219/548
(58) Field of Search ................................. 219/538–544, 219/546, 548, 552, 553, 200, 201, 205, 206; 438/8

(56) References Cited

U.S. PATENT DOCUMENTS

| | | | |
|---|---|---|---|
| 5,242,565 A | 9/1993 | Winsel | |
| 5,707,499 A | 1/1998 | Joshi et al. | |
| 5,763,058 A | 6/1998 | Isen et al. | |
| 6,358,488 B1 | 3/2002 | Suda | |
| 6,403,403 B1 | 6/2002 | Mayer et al. | |
| 6,437,640 B1 | 8/2002 | Mayer et al. | |
| 6,632,674 B1 * | 10/2003 | Warburton | 436/8 |
| 2002/0068207 A1 | 6/2002 | Baldauf et al. | |
| 2002/0132146 A1 | 9/2002 | Mund | |

FOREIGN PATENT DOCUMENTS

| | | |
|---|---|---|
| DE | 19841993 | 3/2000 |
| JP | 2002231425 | 8/2002 |
| WO | WO99/06614 | 2/1999 |
| WO | WO01/74710 | 10/2001 |
| WO | WO02/080620 | 10/2002 |

* cited by examiner

*Primary Examiner*—Tu Hoang

(57) ABSTRACT

A thermally efficient resistive heater assembly for heating a source substance for generation of gas has a chamber for containing the source substance, a thin resistive heating element suspended across an aperture and disposed for immersion in the source substance, and conductive traces electrically coupled to the thin resistive heating element. The resistive heater assembly may be fabricated by a specially adapted method including providing a first substrate layer, bonding to it a second substrate layer, the second substrate layer bearing the resistive heating element and conductive traces, bonding to that an optional hydrophobic layer if necessary, and bonding to the previous layer a top layer. At least one of the layers may include manifolding for the gas. All or part of the fabrication method may be performed as a reel-to-reel process.

31 Claims, 4 Drawing Sheets

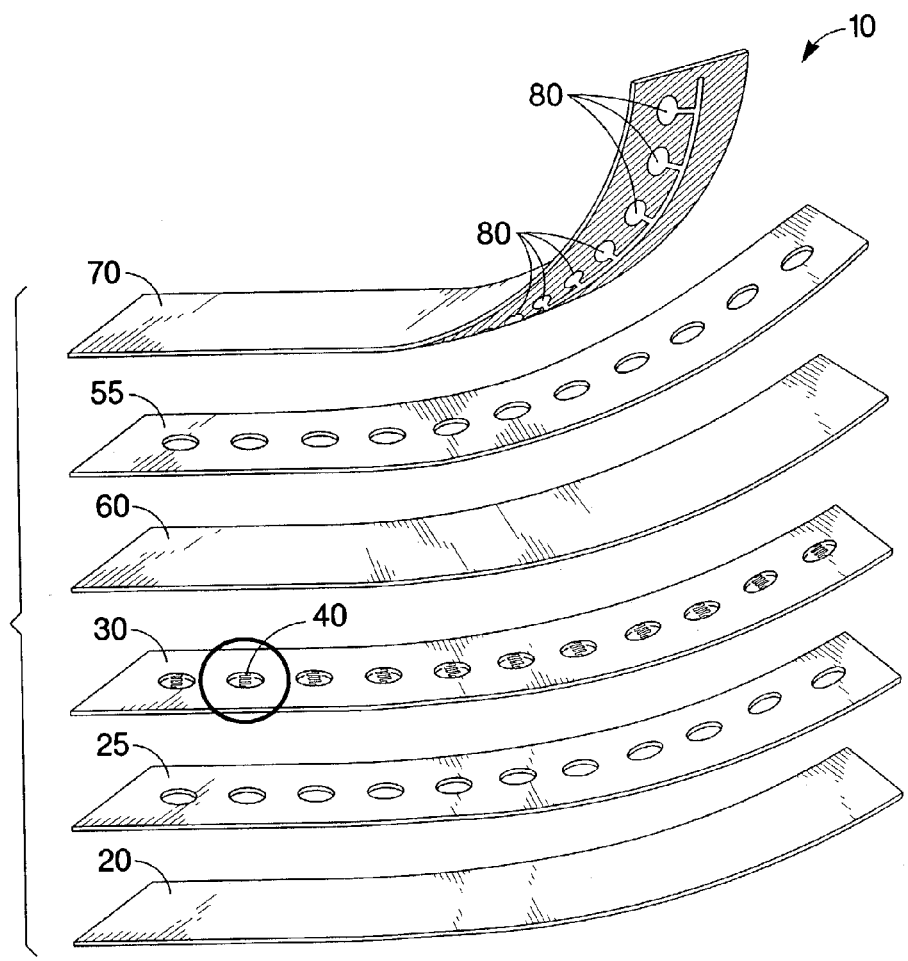
Fig. 4
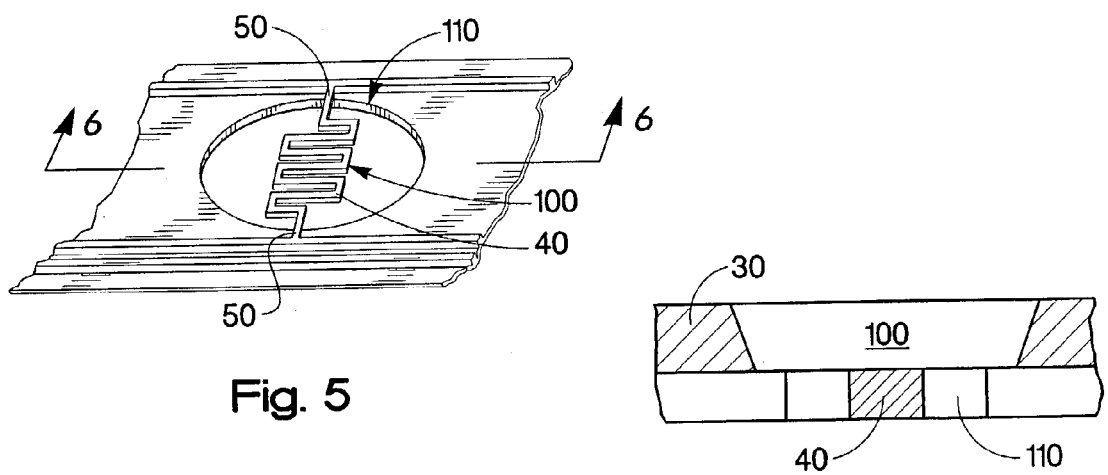
Fig. 5
Fig. 6

FUEL-CELL RESISTORS AND METHODS

TECHNICAL FIELD

This invention relates to fabrication of resistive heaters. More particularly, it relates to methods for fabrication of resistors used in heating a source substance for the generation of hydrogen or other gas for fuel cells. The invention also relates to apparatus fabricated by such methods.

BACKGROUND

Various portable devices, such as laptop computers, personal digital assistants (PDA's), portable digital and video cameras, portable music players, portable electronic games, and cellular phones or other wireless devices, require portable power sources. The weight and inconveniences of single-use batteries and rechargeable batteries have motivated efforts to replace those power sources for portable use. Thus, there is an increasing demand for light-weight, reusable, efficient, and reliable power sources in such applications and in many other applications as well. In attempts to meet these needs, various portable fuel cells have been developed, such as ceramic-based solid-oxide fuel cells, direct methanol fuel-cell (DMFC) systems, reformed-methanol-to-hydrogen fuel-cell (RMHFC) systems, and other proton-exchange-membrane (PEM) fuel-cell systems. For those fuel cells that use a gas such as hydrogen as their fuel, local generation of the gas is desirable, and may be significantly safer than storing a quantity of gas. Heating of a source substance to evolve gas for the fuel cell's fuel can be an efficient way to generate the gas locally. The efficiency of such an arrangement depends upon minimizing heat loss. There is a continuing need and a large anticipated market for improved practical compact portable fuel cells with rapid startup times and improved efficiency.

BRIEF DESCRIPTION OF THE DRAWINGS

The features and advantages of the disclosure will readily be appreciated by persons skilled in the art from the following detailed description when read in conjunction with the drawings, wherein:

FIG. 4 is a perspective exploded view of an embodiment of a resistive heater assembly made in accordance with the invention.

FIG. 5 is a perspective view showing a detail of FIG. 4, enlarged.

FIG. 6 is a side-elevation cross sectional view of the detail shown in FIG. 5.

DETAILED DESCRIPTION OF EMBODIMENTS

In the present specification and the appended claims, the term "manifolding" refers to a path or paths provided for guiding gas to a desired location in relation to the location where the gas is generated.

Various embodiments of resistive heater assemblies are described below. For clarity, the heater assembly embodiments are described in the context of heating a source substance for generation of gas such as hydrogen for use in a fuel cell. For hydrogen generation, the source substance may be sodium borohydride, for example, heated to a suitable temperature (about 80° C. or higher).

Each heater assembly embodiment described below has a chamber for containing the source substance, a thin resistive heating element suspended across an aperture and disposed for immersion in the source substance (or at least intimate thermal contact with the source substance) and conductive traces electrically coupled to the thin resistive heating element for energizing it.

Fabrication Process

Figure 1:
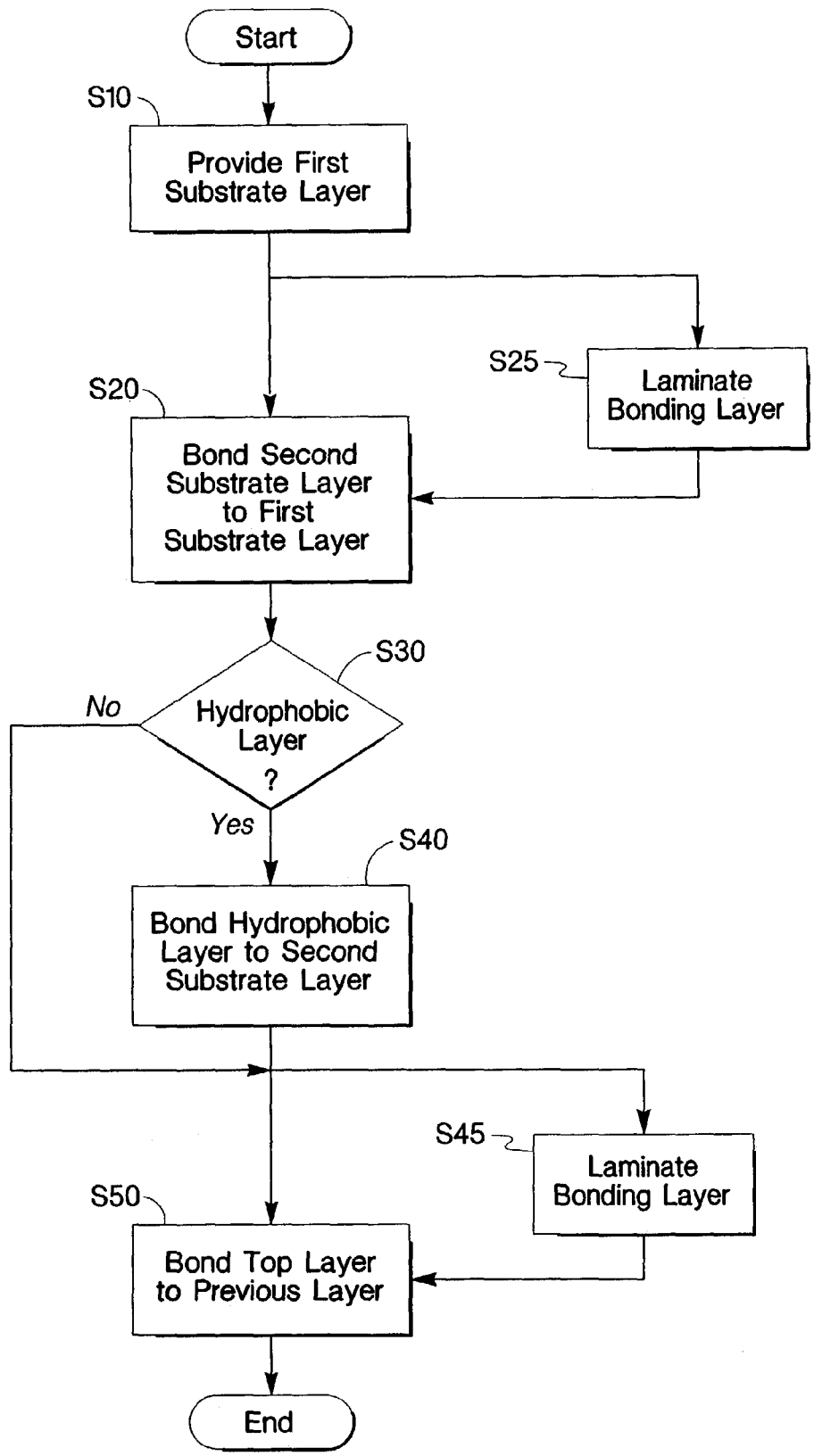
FIG. 1 is a flow chart showing an embodiment of a fabrication method performed in accordance with the invention.

A resistive heater assembly 10 may be fabricated by specially adapted fabrication methods of which various embodiments are illustrated by the flow chart of FIG. 1. FIG. 1 includes some "optional" steps that are performed in some method embodiments but not in other embodiments, depending on the properties of materials used and on specific applications of the device. Various steps of the method embodiments are designated by reference numerals S10, S20, . . . , etc. As shown in FIG. 1, such a method includes providing a first substrate layer 20 (step S10) and bonding to it a second substrate layer 30 (step S20). The second substrate layer 30 bears the resistive heating element 40 and conductive traces 50. The bonding S20 of the second substrate layer 30 to the first substrate layer 20 may be performed by laminating a first bonding layer 25 (step S25) between first substrate layer 20 and second substrate layer 30. In step S30, a decision is made as to whether an optional hydrophobic layer 60 is required. If it is, then in step S40, the optional hydrophobic layer 60 is bonded to the second substrate layer 30. A hydrophobic layer 60 is used when it is desired to block water or aqueous solutions from regions that should contain only non-aqueous matter, e.g. hydrogen gas.

In step S50, a top layer 70 is bonded to the previous layer, e.g., the optional hydrophobic layer. Bonding step S50 may be performed by laminating a second bonding layer 55 (step S45) between second substrate layer 30 and optional hydrophobic layer 60. If optional hydrophobic layer 60 is omitted, then the previous layer is second substrate layer 30 and that is the layer to which top layer 70 is bonded in step S50. At least one of the layers above resistive heating element 40, for example top layer 70, may include manifolding 80 for the gas.

Various bonding steps of the process (S20, S40, and S50) may be performed by conventional bonding methods, such as ultrasonic bonding, RF bonding, thermal welding, or use of suitable adhesives. It will be recognized by those skilled in the art that wherever an aperture is needed, the aperture may be formed by punching, etching, or other conventional methods. Similarly, those skilled in the art will recognize that if a depression or well is needed for a reservoir or collection space, the depression or well may be formed where it is needed, by embossing, molding, etching, or other conventional method.

Thus, one aspect of this embodiment is an overall method for fabricating a heater assembly 10 for generation of gas, which, in outline, comprises the steps of providing a suitable first substrate layer 20; bonding to the first substrate layer a second substrate layer 30 (the second substrate layer bearing a resistive heating element 40 and conductive traces 50 electrically coupled to the resistive heating element); if necessary, bonding to the second substrate layer a hydrophobic layer 60; and bonding to the previous layer a top layer 70 (one of the layers including manifolding 80 for the gas). The previous layer may be the hydrophobic layer 60 or second substrate layer 30, for example. Bonding layers 25 and 55 are used as appropriate. Thus, it will be readily recognized that, if the hydrophobic layer 60 is omitted, top layer 70 may be bonded to second substrate layer 30, either directly or by means of a bonding layer 55.

All or part of the fabrication method may be performed as a reel-to-reel process, by using conventional feed reels and take-up reels and by indexing using conventional indexing methods, such as sprocket holes or other alignment marks. Thus, feeding the first substrate layer from a feed reel and taking up the completed resistive heater assembly on a take-up reel makes up a simple example of a process partially implementing the reel-to-reel method. Each of the other individual layers may be fed from a feed reel: the second substrate layer, the hydrophobic layer (if used), the top layer, and one or both of the first and second bonding layers (if used). In a full reel-to-reel process without bonding layers, each of the first substrate layer, the second substrate layer, the hydrophobic layer, and the top layer is fed from its respective feed reel and the completed resistive heater assembly is taken up on a take-up reel. In a full reel-to-reel process with both bonding layers, the first and second bonding layers are fed from their respective feed reels in the appropriate order to perform laminating steps S25 and S35 to form the laminated film stack of some structural embodiments (described below).

Structural Embodiments

The following detailed description includes a number of different structural embodiments, illustrated by FIGS. 2–7. A first embodiment of a resistive heater assembly 10 for heating a source substance for generation of gas has a chamber 100 for containing the source substance, a thin resistive heating element 40 suspended across an aperture 110 and disposed for immersion in the source substance, and conductive traces 50 electrically coupled to the thin resistive heating element. Suspending the thin resistive heating element 40 across an aperture, where it may be surrounded by and substantially centered within the source substance, greatly reduces the parasitic heat losses that occur in other structures, such as heaters mounted on printed-circuit board material. Heat from thin resistive heating element 40 is conducted directly into the source substance in contact with it. Some heat is lost by conduction through conductive traces 50, but that is a small amount of heat loss compared with the heat loss occurring in other structures. Furthermore, it will be recognized that resistive heating element 40 may be substantially centered within the resistive heater assembly 10, which further reduces parasitic heat losses. For fuel cell systems, parasitic heat losses directly correlate to parasitic power losses, minimization of which is a primary goal in order to increase net power output.

Figure 2:
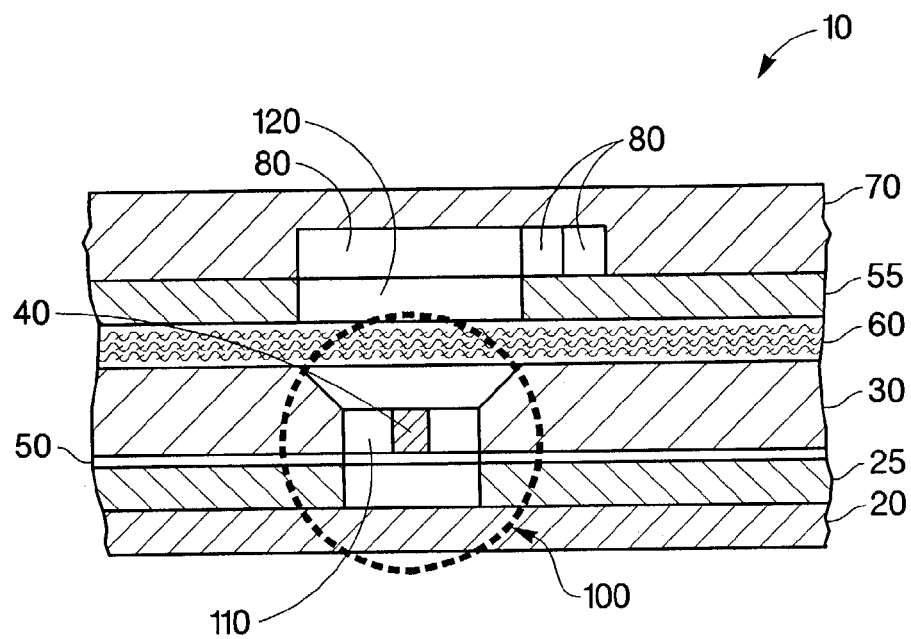
FIG. 2 is a side-elevation cross sectional view of an embodiment of a resistive heater assembly made in accordance with the invention.
Figure 3:
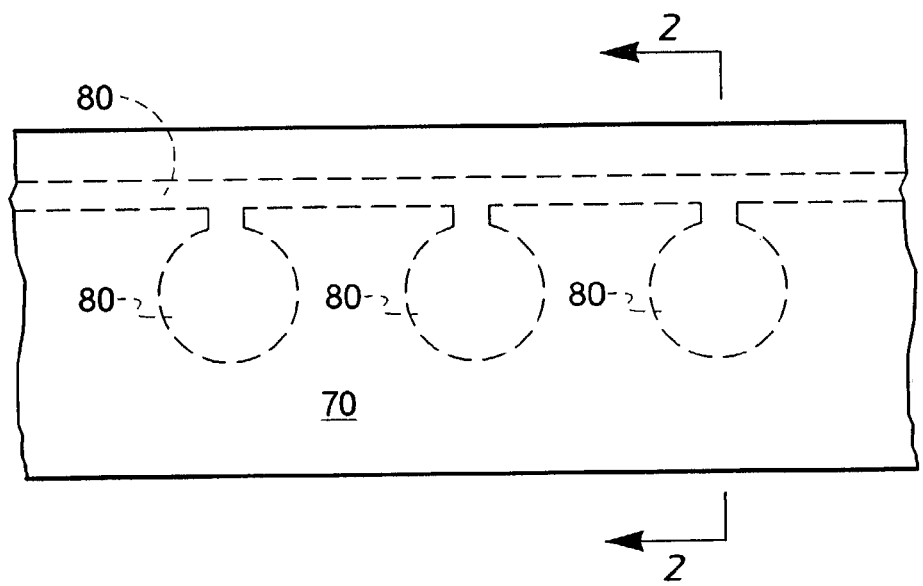
FIG. 3 is a top plan view of the embodiment of FIG. 2.

FIGS. 2 and 3 show a side-elevation cross sectional view and a top plan view respectively of an embodiment of a resistive heater assembly made in accordance with the invention.

As shown in FIGS. 2 and 3, resistive heater assembly 10 for heating a source substance has a chamber 100 for containing the source substance. Chamber 100 includes an aperture 110. At least a portion of thin resistive heating element 40 is suspended across aperture 110, to be immersed in the source substance. Conductive traces 50 are electrically coupled to thin resistive heating element 40 for supplying current to energize resistive heating element 40. In FIGS. 2 and 3, substantially all of thin resistive heating element 40 is suspended across aperture 110. Aperture 110 extends completely through the second substrate layer 30. Thus, in the embodiment of FIGS. 2 and 3, aperture 110 and chamber 100 are essentially identical, i.e., aperture 110 forms and defines chamber 100. Thin resistive heating element 40 is suspended across chamber 100 in this embodiment. A second chamber 120 for collecting gas and/or for providing a path for guiding gas into manifolding 80 may be provided in the second substrate layer 55 or in the top layer 70 or partially in each layer. Manifolding 80 for the gas may be very simple, as shown in FIG. 3, or more complex, depending on requirements of the application.

FIG. 4 is a perspective exploded view of another embodiment of a resistive heater assembly made in accordance with the invention, and FIG. 5 is a perspective view showing a detail of FIG. 4, enlarged. FIG. 6 is a side-elevation cross sectional view of the detail of FIG. 5.

As shown in FIGS. 4–6, resistive heater assembly 10 may be formed as a stack of relatively thin layers laminated together: a first substrate layer 20, a second substrate layer 30 bonded to first substrate layer 20 by a first bonding layer 25, an optional hydrophobic layer 60 bonded to the second substrate layer, and a top layer 70 bonded to the optional hydrophobic layer by a second bonding layer 55. Resistive heating element 40 and conductive traces 50 electrically coupled to resistive element 40 are borne by the second substrate layer 30. In the embodiment of FIGS. 4–6, top layer 70 includes manifolding 80 for the gas.

Top layer 70 may comprise a single film of a suitable substance such as a polyester, polyimide, polyether ether ketone (PEEK), and poly(etherimide) (PEI), with manifolding 80 embossed or molded into its bottom surface. Alternatively, top layer 70 may be formed from two or more sub-layers, for example, a film of a suitable substance such as polyimide as one sub-layer and a layer of copper deposited on its surface as a second sub-layer, etched using conventional photolithography to form manifolding 80. Other conventional methods known to those skilled in the art may be used for forming such a multilayer embodiment of top layer 70 (not shown in the drawings).

Hydrophobic layer 60 may comprise a hydrophobic polymer conventionally used in fuel-cell construction. Like all the other layers, it should also be resistant to the temperatures present when the source substance evolves the desired gas. A typical example of a suitable material for hydrophobic layer 60 is polytetrafluoroethylene (PTFE), specifically expanded PTFE, fibrillated PTFE, or microporous PTFE.

As mentioned above, resistive heater assembly 10 may include a first bonding layer 25 laminated between the second substrate layer 30 and the first substrate layer 20 and/or a second bonding layer 55 laminated between the optional hydrophobic layer 60 and top layer 70. These bonding layers may be formed from a thermosetting resin such as a phenolic thermosetting resin or an epoxy material. Other suitable adhesive materials may be used for the bonding layers.

Resistive heating element 40 borne by the second substrate layer 30 may comprise any suitable resistive substance, deposited in a thin film and patterned to form an elongated narrow strip. The pattern of resistive heating element 40 may be serpentine, as shown in FIG. 5. The desired resistance is achieved by suitable geometric design, taking into account the resistivity of the material. Particular suitable materials include tantalum-aluminum alloy, nickel-chromium alloy, and tungsten-silicon-nitride. Other suitable substances include copper, aluminum, copper-aluminum, vanadium, niobium, tantalum, chromium, molybdenum, tungsten, nickel, palladium, platinum, silver, gold, silicon, and alloys and mixtures thereof. First substrate layer 20 and/or second substrate layer 30 may comprise films of a suitable substance such as a polyester, polyimide, polyether ether ketone (PEEK), and poly(etherimide) (PEI). The compositions of hydrophobic layer 60 and top layer 70 are described hereinabove.

The thicknesses of the various layers 20, 30, 60, and 70 are generally not critical, but the volume of chamber 100 needed to contain a desired quantity of source substance such as sodium borohydride for a particular fuel-cell application may impose a minimum requirement for the thickness of second substrate layer 30.

In the exemplary embodiment of FIG. 4, chamber 100 is formed by openings extending through first bonding layer 25 and second substrate 30. The opening 120 shown in second bonding layer 55 provides a path communicating from chamber 100 to manifolding 80. Thus, in this embodiment, chamber 100 is disposed partially within second substrate 30, and partially within bonding layer 25. While chamber 100 contains source substance, it will be recognized that it is not generally necessary to fill chamber 100 with source substance. As gas is evolved from the source substance, the gas may occupy a portion of the volume of chamber 100. In the case of generating hydrogen from a sodium borohydride source solution, for example, hydrogen gas will rise to the top portion of chamber 100.

Figure 7:
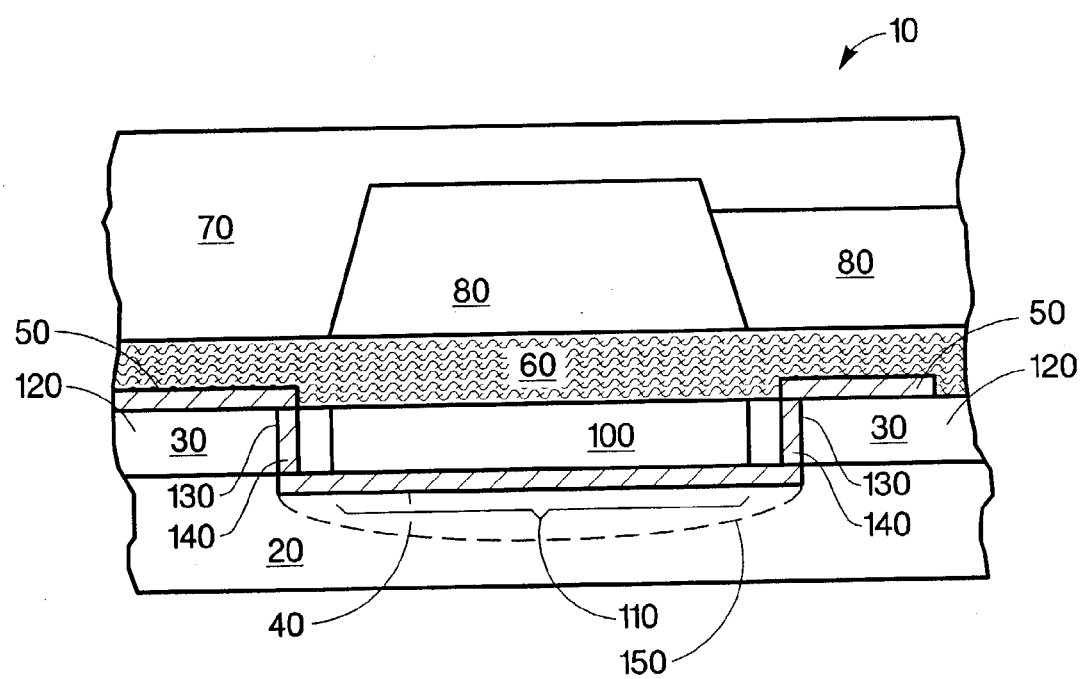
FIG. 7 is a side-elevation cross sectional view of another embodiment of a resistive heater assembly made in accordance with the invention.

Another embodiment of resistive heater assembly 10 is shown in FIG. 7 in a side elevation cross-sectional view. As shown in FIG. 7, second substrate layer 30 may comprise a medial layer 120 having resistive heating element 40 on one side, conductive traces 50 on the other side, and via openings 130 extending through the medial layer 120. Conductive traces 50 are electrically coupled to the resistive heating element 40 by conductive material 140 disposed in the via openings 130 that extend through medial layer 120. In the embodiment shown, resistive element 40 is suspended across the aperture formed by the lower end of chamber 100.

In the simple exemplary embodiment of FIG. 7, chamber 100 consists of an opening extending through second substrate layer 30. Chamber 100 is shown in FIG. 7 as being entirely within second substrate layer 30, above resistive heating element 40. However, a depression or well 150 (shown dashed in FIG. 7) may be formed in first substrate layer 20, aligned with resistive heating element 40, thus increasing the effective volume of chamber 100. Such a depression or well may be formed in first substrate layer 20 by molding or embossing, for example. Similarly, in various other embodiments (not shown) wells of suitable shape may be formed in first and/or second bonding layers 25 and 55, in hydrophobic layer 60 or in top layer 70.

In the embodiment of FIG. 7, the bottom side of medial layer 120 of second substrate layer 30, which bears resistive heating element 40, is bonded to first substrate layer 20, and the top side of medial layer 120, which bears conductive traces 50, is bonded to hydrophobic layer 60. In other embodiments (not shown), the side of medial layer 120 of second substrate layer 30 that bears conductive traces 50 may be bonded to the substrate layer 20, and the side of medial layer 120 which bears resistive heating element 40 may be bonded to hydrophobic layer 60. In the latter case, resistive element 40 may be suspended across an aperture formed by the upper end of chamber 100. It will be recognized that, with suitable thicknesses of various layers, and suitable positioning of aperture 110, resistive heating element 40 borne by second substrate layer 30 may be substantially centered within the resistive heater assembly 10, vertically or laterally or both vertically and laterally.

In some cases, heating alone may not be effective in evolving a desired quantity of gas, and the desired reaction may require catalysis. For such cases, resistive heating element 40 may comprise a catalytic layer for catalyzing a gas-generation reaction and a thermally removable coating covering the catalytic layer. The catalytic layer may comprise a metal such as ruthenium, platinum, or nickel, for example. The thermally removable coating may be a sublimable substance and may be a polymer. Paraffin is a suitable thermally removable coating for some applications.

Thus, a resistive heating assembly made in accordance with the present invention may be used to generate gas for a fuel cell. A source substance, from which the desired gas may be generated by heating, is introduced into at least a portion of chamber 100, in thermal contact with resistive heating element 40. This may be accomplished by immersing resistive heating element 40 in the source substance, e.g., by filling chamber 100 with the source substance to at least a level sufficient to immerse resistive heating element 40 in the source substance. Energizing resistive heating element 40 by passing electric current through conductive traces 50 provides heat to generate the desired gas from the source substance. The gas thus generated may be used in a fuel cell assembly associated with resistive heating assembly 10, e.g., associated by virtue of receiving gas through manifolding 80. The electric current fed through conductive traces 50 to resistive heating element 40 may be controlled in accordance with power requirements of the fuel cell assembly with which the resistive heating assembly 10 is associated. The power requirements in turn may be determined from the electrical load on the fuel cell assembly.

The resistive heater assembly 10 may be incorporated into a fuel cartridge, into a fuel cell assembly, and/or into an electronic device. An integrated circuit may include the resistive heater assembly 10 integrated with other devices, such as control circuitry for controlling the generation of gas by the resistive heater assembly in response to a control signal input. The control signal input can be responsive to the electrical load on a fuel cell employing fuel gas generated by the resistive heater assembly 10. Conventional integrated-circuit fabrication methods may be used along with the methods disclosed herein to make such an integrated circuit.

INDUSTRIAL APPLICABILITY

Although the foregoing has been a description and illustration of specific embodiments of the invention, various modifications and changes thereto can be made by persons skilled in the art without departing from the scope and spirit of the invention as defined by the following claims. For example, multiple resistive heating elements may be combined in the same heater assembly for use at various times or for providing various levels of heat, and the conductive traces used to energize them may be combined or may be separate.

What is claimed is:

1. A resistive heater assembly for heating a source substance for generation of gas from the source substance, the resistive heater assembly comprising:

a) a first substrate layer;

b) a second substrate layer, a resistive heating element, and conductive traces electrically coupled to the resistive heating element, the second substrate layer bearing the resistive heating element and the conductive traces, and the second substrate layer being bonded to the first substrate layer;

c) a hydrophobic layer bonded to the second substrate layer; and d) a top layer bonded to the hydrophobic layer, at least one layer of the heater assembly including a manifolding for the gas.

2. The resistive heater assembly of claim 1, further comprising a first bonding layer laminated between the second substrate layer and the first substrate layer.

3. The resistive heater assembly of claim 2, wherein the first bonding layer comprises a thermosetting resin.

4. The resistive heater assembly of claim 2, wherein the first bonding layer comprises a phenolic resin.

5. The resistive heater assembly of claim 2, wherein the first bonding layer comprises an epoxy material.

6. The resistive heater assembly of claim 2, further comprising a second bonding layer laminated between the second substrate layer and the hydrophobic layer.

7. The resistive heater assembly of claim 1, further comprising a second bonding layer laminated between the second substrate layer and the hydrophobic layer.

8. The resistive heater assembly of claim 7, wherein the second bonding layer comprises a thermosetting resin.

9. The resistive heater assembly of claim 7, wherein the second bonding layer comprises a phenolic resin.

10. The resistive heater assembly of claim 7, wherein the first bonding layer comprises an epoxy material.

11. The resistive heater assembly of claim 1, wherein the second substrate layer comprises a medial layer having first and second sides, the resistive heating element is on the first side thereof, the conductive traces are on the second side thereof, and openings extend through the medial layer, the conductive traces being electrically coupled to the resistive heating element by conductive material disposed in the openings extending through the medial layer.

12. The resistive heater assembly of claim 11, wherein the first side of the medial layer of the second substrate layer is bonded to the first substrate layer.

13. The resistive heater assembly of claim 11, wherein the first side of the medial layer of the second substrate layer is bonded to the hydrophobic layer.

14. The resistive heater assembly of claim 11, wherein the second side of the medial layer of the second substrate layer is bonded to the first substrate layer.

15. The resistive heater assembly of claim 11, wherein the second side of the medial layer of the second substrate layer is bonded to the hydrophobic layer.

16. The resistive heater assembly of claim 1, wherein the resistive heating element borne by the second substrate layer is substantially centered within the resistive heater assembly.

17. The resistive heater assembly of claim 1, wherein the resistive heating element borne by the second substrate layer further comprises a catalytic layer for catalyzing a gas-generation reaction and a thermally removable coating covering the catalytic layer.

18. The resistive heater assembly of claim 17, wherein the catalytic layer comprises a metal selected from the list consisting of ruthenium, platinum, and nickel.

19. The resistive heater assembly of claim 17, wherein the thermally removable coating comprises a sublimable substance.

20. The resistive heater assembly of claim 17, wherein the thermally removable coating comprises a polymer.

21. The resistive heater assembly of claim 17, wherein the thermally removable coating comprises paraffin.

22. The resistive heater assembly of claim 1, wherein the resistive heating element borne by the second substrate layer further comprises:

a transition metal suitably patterned and adapted to provide resistive heating, a ruthenium plating on the transition metal to provide a catalytic layer, and a polymer coated on the catalytic layer adapted to provide a thermally removable coating.

23. The resistive heater assembly of claim 1, wherein the resistive heating element borne by the second substrate layer comprises a thin film patterned in a serpentine pattern.

24. The resistive heater assembly of claim 1, wherein the resistive heating element borne by the second substrate layer comprises a substance selected from the list consisting of tantalum-aluminum alloy, nickel-chromium alloy, tungsten-silicon-nitride, copper, aluminum, copper-aluminum, vanadium, niobium, tantalum, chromium, molybdenum, tungsten, nickel, palladium, platinum, silver, gold, silicon, and alloys and mixtures thereof.

25. The resistive heater assembly of claim 1, wherein the first substrate layer comprises a substance selected from the list consisting of polyester, polyimide, polyether ether ketone (PEEK), and poly(etherimide) (PEI).

26. The resistive heater assembly of claim 1, wherein the second substrate layer comprises a substance selected from the list consisting of polyester, polyimide, polyether ether ketone (PEEK), and poly(etherimide) (PEI).

27. The resistive heater assembly of claim 1, wherein the hydrophobic layer comprises a substance selected from the list consisting of polytetrafluoroethylene (PTFE), expanded PTFE, fibrillated PTFE, and microporous PTFE.

28. The resistive heater assembly of claim 1, wherein the top layer includes manifolding for the gas.

29. The resistive heater assembly of claim 1, wherein the top layer comprises a plurality of sub-layers.

30. The resistive heater assembly of claim 1, wherein one sub-layer of the plurality of sub-layers of the top layer includes the manifolding for the gas.

31. A resistive heater assembly for heating a source substance for generation of gas from the source substance, the resistive heater assembly comprising:

a) a first substrate layer;

b) a second substrate layer, a resistive heating element, and conductive traces electrically coupled to the resistive element, the second substrate layer bearing the resistive heating element and the conductive traces, and the second substrate layer being bonded to the first substrate layer;

c) a hydrophobic layer bonded to the second substrate layer; and d) a top layer bonded to the hydrophobic layer, at least one layer of the heater assembly including a manifolding for the gas and the resistive heating element borne by the second substrate layer being substantially centered within the resistive heater assembly.

* * * * *